(12) United States Patent
Bunk

(10) Patent No.: US 8,737,047 B2
(45) Date of Patent: May 27, 2014

(54) OPERATING DEVICE FOR OPERATING AUTOMATION TECHNOLOGY MACHINERY

(75) Inventor: Jens-Andre Bunk, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 397 days.

(21) Appl. No.: 13/167,459

(22) Filed: Jun. 23, 2011

(65) Prior Publication Data

US 2011/0317352 A1 Dec. 29, 2011

(30) Foreign Application Priority Data

Jun. 23, 2010 (EP) ..................................... 10166958

(51) Int. Cl.
*H05K 5/00* (2006.01)
(52) U.S. Cl.
USPC .................................................... 361/679.01
(58) Field of Classification Search
USPC .................................................... 361/679.01
See application file for complete search history.

(56) References Cited

U.S. PATENT DOCUMENTS

| | | | |
|---|---|---|---|
| 5,736,070 A * | 4/1998 | Murakami et al. | 252/512 |
| 5,981,043 A * | 11/1999 | Murakami et al. | 428/209 |
| 6,185,108 B1 | 2/2001 | Okura et al. | |
| 7,983,036 B2 * | 7/2011 | Ruch et al. | 361/679.55 |
| D674,390 S * | 1/2013 | Stoops | D14/432 |
| 2003/0108374 A1 | 6/2003 | Lien | |

FOREIGN PATENT DOCUMENTS

| | | |
|---|---|---|
| CN | 1236536 | 11/1999 |
| DE | 29 26 312 | 1/1981 |
| DE | 199 23 806 | 2/2001 |
| DE | 20120217 | 3/2002 |
| DE | 10 2006 057 546 | 1/2008 |
| WO | WO 9907198 | 2/1999 |
| WO | WO 03/075297 | 9/2003 |

OTHER PUBLICATIONS

Derwent abstract of WO03075297.*
Eisfeld D., "Folientastaturen—Eine Elektrostatische Zündquelle?", Elektrotechnische Zeitschrift—ETZ, VDE Verlag GmbH, vol. 114, No. 14/15, Jul. 1, 1993, pp. 908-910.

* cited by examiner

*Primary Examiner* — Forrest M Phillips
(74) *Attorney, Agent, or Firm* — Cozen O'Connor

(57) ABSTRACT

An operating device for operating automation technology machinery includes a transparent electrically non-conducting panel having an outer side and an inner side facing the interior of the operating device, and a membrane keyboard arranged on the outer side of the panel. The panel also includes channels extending through the panel from the outer side to the inner side, where an electrically conducting element is arranged in the channels and the membrane keyboard is connected to the electronics of the operating device by the electrically conducting elements. An operating device for operating automation technology machinery is thus provided in which it is possible to fit a membrane keyboard to any location on the front panel of the operating device.

5 Claims, 4 Drawing Sheets

OPERATING DEVICE FOR OPERATING AUTOMATION TECHNOLOGY MACHINERY

BACKGROUND OF THE INVENTION

1. Field of the Invention

The invention relates to operating devices and, more particularly, to an operating device for operating automation technology machinery.

2. Description of the Related Art

In commercially available operating devices for operating automation technology machinery, such as machine tools and/or production machines, in which the front panel consists of aluminum, sheet metal or plastic, the strip conductors of the membrane keyboard are led from the membrane keyboard to the electronics of the operating device arranged at the interior of the operating device by special flat cables also known as ribbon cables. For this purpose, a sizeable aperture is made in the front panel and the ribbon cables are led through the aperture. If necessary, the aperture is subsequently sealed, for example, by adhesive bonding. This connecting technique is known, and successfully proven, and is used in areas of the front panel of the operating device (in the case of front panels of aluminum, sheet metal or plastic), with which no production problems are encountered in this respect. For design reasons, the aperture for leading through the ribbon cables in the front panel lies under the membrane keyboard.

As previously stated, in the case of this conventional connecting technique, it is necessary to create a sizeable aperture in the front panel of the operating device to allow an electrical connection of the membrane keyboard and the electronics of the operating device. A comparable sizeable aperture in a glass panel is technically possible in principle, but very laborious to produce and involves a considerably increased risk of the panel breaking. This problem can be avoided by using plastic panels, since sizeable apertures can be made in them without any problem.

However, plastic panels have the fundamental disadvantage that they are less scratch-resistant in comparison to glass panels and have lower resistance to chemicals. Furthermore, with plastic panels there is the risk of discoloration of the material due to ambient influences, such as temperature, chemicals and harmful gases.

Furthermore, in the case of commercially available operating devices, membrane keyboards cannot be attached just anywhere on the front panel, because the aperture for the ribbon cable must not be externally visible, and consequently must, for example, disappear under a front surround. Consequently, the membrane keyboard can only be fitted at the periphery of the front panel. Moreover, the large aperture in the panel that is required for leading through the ribbon cable cannot be sealed well. Harmful gases and moisture can therefore get into the interior of the operating device and cause damage there to the electronics.

SUMMARY OF THE INVENTION

It is therefore an object of the invention to provide an operating device for operating an automation technology machinery in which it possible to fit a membrane keyboard to any location on a front panel of the operating device. The invention allows much greater freedom in the design of operating front panels with regard to the number, form and position of the membrane keyboards.

This and other objects and advantages are achieved by an operating device for operating automation technology machinery, wherein the operating device includes a transparent electrically non-conducting panel having an outer side and an inner side, facing the interior of the operating device, where a membrane keyboard is arranged on the outer side of the panel. The panel also includes channels extending through the panel from the outer side to the inner side, where an electrically conducting element is arranged in the channels and the membrane keyboard is connected to the electronics of the operating device by the electrically conducting elements.

In an advantageous embodiment, the panel comprises a glass panel or a plastic panel. Glass panels have a greater scratch resistance and chemical resistance than plastic panels. A plastic panel, however, has the advantage over a glass panel that it is less expensive.

In another advantageous embodiment, the electrically conducting element comprises a pin, an electrically conducting paste, an electrically conducting silicone material or a line conductor. Such a form of the electrically conducting element represents a customary form.

Furthermore, it is advantageous if the pin has a gold coating, since the pin is then particularly robust with respect to unfavorable ambient influences, such as moisture.

In accordance with the contemplated embodiments, the automation technology machinery comprises a machine tool and/or production machine and represents a customary form of the machine.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in more detail below and represented in the drawing, in which.

DETAILED DESCRIPTION OF THE PRESENTLY PREFERRED EMBODIMENTS

Figure 1:
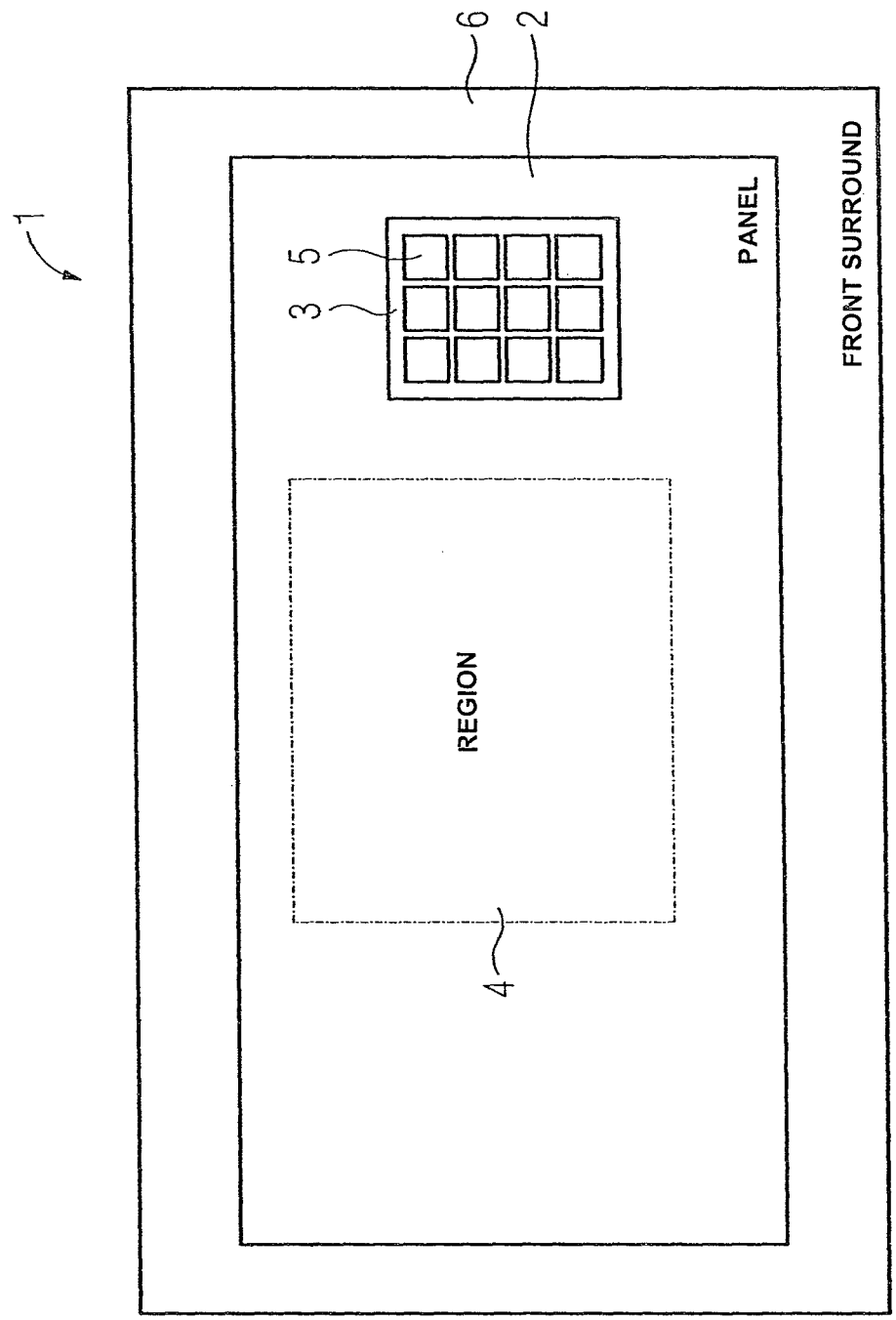
FIG. 1 shows a view from the front of an operating device according to the invention in the form of a schematized representation, which shows an operator of the operating device when operating automation technology machinery.

FIG. 1 is a schematic front view of an operating device 1 for operating automation technology machinery in accordance with the invention. The view shown in FIG. 1 is from the front of the operating device showing an operator of the operating device when operating the automation technology machinery. The operating device 1 has a transparent electrically non-conducting panel 2, which in the exemplary embodiment is formed as a glass panel. Alternatively, the panel may also be formed from plastic, and consequently take the form of a plastic panel. However, the panel 2 in the form of a glass panel has the advantage over the panel 2 in the form of a plastic panel in that a panel of glass is much more scratch-resistant and insensitive to the effect of chemicals than a panel of plastic.

In the exemplary embodiment, the panel 2 has a front surround 6 that covers the peripheral region of the panel 2. The operating device 1 also has a membrane keyboard 3, which has keys, only one key 5 being provided with a reference designator for the sake of overall clarity. Furthermore, the panel 2 has a region 4, identified in FIG. 1 by dash-dotted lines, behind which a display 8 (see FIG. 6) is arranged.

Figure 2:
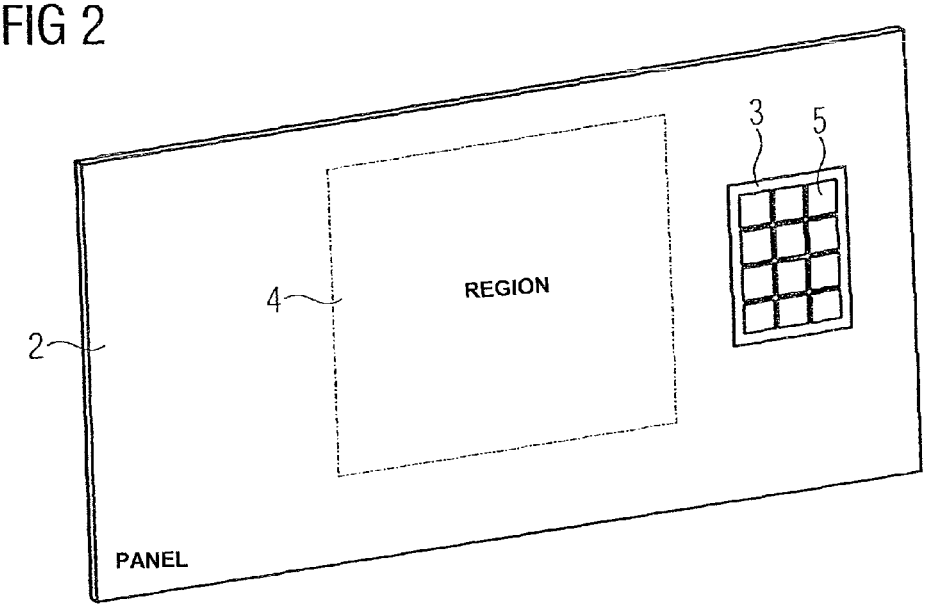
FIG. 2 shows a schematized representation of a panel of the operating device in which a membrane keyboard is arranged.

FIG. 2 is a schematic perspective view of the panel 2 and the membrane keyboard 3. The same elements are provided in FIG. 2 with the same reference designators as in FIG. 1. The panel 2 has an outer side 14, facing an operator when operating the operating device, and an inner side 15, facing the interior 19 of the operating device 1 (see FIG. 4 and FIG. 6). The outer side 14 runs parallel to the inner side 15. The membrane keyboard 3 is arranged on the outer side 14 (see FIG. 4) of the panel 2.

Figure 3:
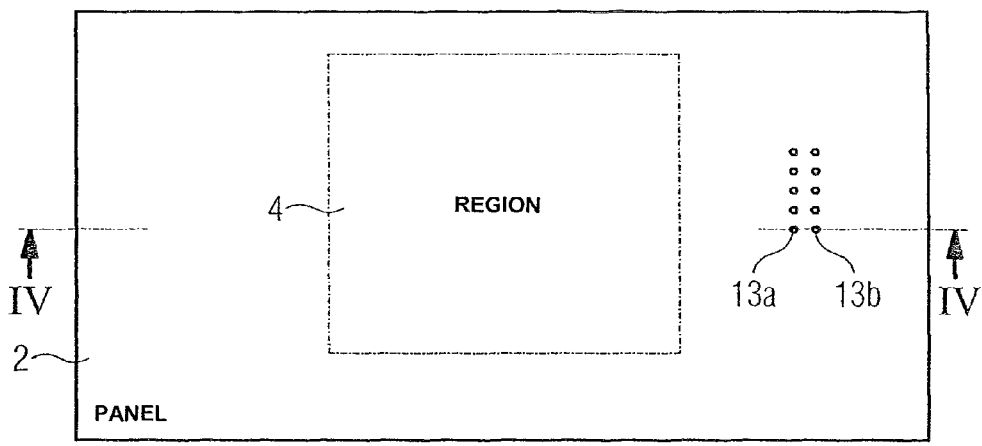
FIG. 3 shows a panel of the operating device.

In FIG. 3, the panel 2 is shown without the membrane keyboard 3 fitted to the outer side 14. The same elements are provided with the same reference signs as in FIG. 1. To connect the membrane keyboard 3 to the electronics 9 arranged in the interior 19 of the operating device 1 (see FIG. 6), the panel 2 has channels extending through the panel from the outer side 14 of the panel 2 to the inner side 15 of the panel 2, only the channels 13a and 13b being provided with reference designators for the sake of overall clarity. In the exemplary embodiment, the channels comprise holes extending through the panel. The channels preferably have a maximum cross-sectional area of 4 mm$^2$ and may be, for example, round, square, rectangular or any other form. It should be noted in this respect that the introduction of such channels that have only a small cross-sectional area (maximum cross-sectional area of 4 mm$^2$) can be technologically accomplished very easily and quickly, for example, by drilling operations, while the introduction of the large apertures routinely used commercially in the case of plastic panels can only be technologically realized very laboriously in the case of glass panels and involves a considerably increased risk of the glass panel breaking.

Figure 4:
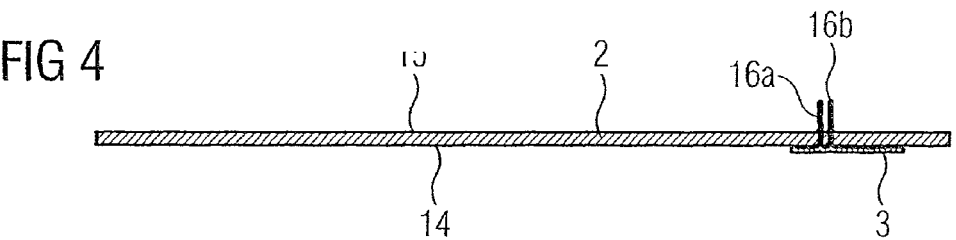
FIG. 4 shows a sectional view of the panel.

FIG. 4 shows a schematic representation of a section through the panel 2, which in FIG. 3, extends along the sectional line IV-IV, where the membrane keyboard 3 that is arranged on the outer side 14 of the panel 2 is additionally shown. The membrane keyboard 3 may, for example, be fastened on the outer side 14 of the panel 2 by an adhesive bond. For electrical connection of the membrane keyboard 3 to the electronics 9 of the operating device 1, arranged in the interior of the operating device 1 in the exemplary embodiment, an electrically conducting element is respectively arranged in the channels and can be used for establishing a single electrically conducting connection between the membrane keyboard 3 and the electronics 9. In the exemplary embodiment, a single electrically conducting element is respectively arranged in the channels.

Figure 5:
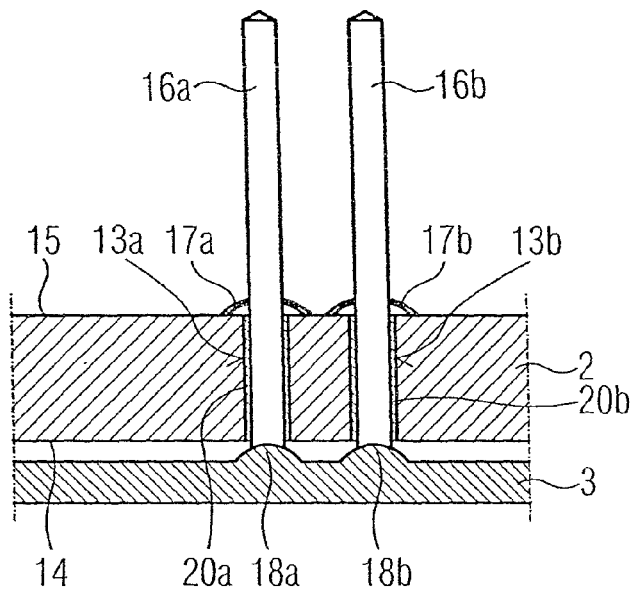
FIG. 5 shows a first exemplary embodiment of an electrically conducting element.

FIG. 5 is a schematic block diagram of the panel 2. The electrically conducting element 16a, 16b is formed here as a pin. The panel 2 has an outer side 14 and an inner side 15. Extending through the panel are the channels 13a and 13b, where the electrically conducting element 16a that is formed as a pin is arranged in the channel 13a and the electrically conducting element 16b that is formed as a pin is arranged in the channel 13b, and where the electrically conducting elements 16a, 16b are led out through the respective channel. The individual channels are spaced apart from one another, and are consequently arranged such that they are electrically insulated from one another. By contrast with commercially available known membrane keyboards, the membrane keyboard 3 does not have a ribbon cable for electrical connection to the outside world, but has in the exemplary embodiment depicted in FIG. 5 electrically conducting contact regions, only the two contact regions 18a and 18b being shown in the sectional representation shown in FIG. 5. The contact regions 18a and 18b have an electrically conducting contact with their respectively assigned electrically conducting element 16a and 16b. In the exemplary embodiment, the electrically conducting elements 16a and 16b are fastened on the inner side 15 of the panel 2 with the aid of lock washers 17a and 17b. Electrically conducting connections between the electrically conducting elements 16a, 16b and the membrane keyboard 3 are established by the contact regions.

In an advantageous embodiment, the pins that serve as electrically conducting elements 16a, 16b have a gold coating, and are consequently particularly robust with respect to unfavorable ambient influences, such as moisture.

Figure 6:
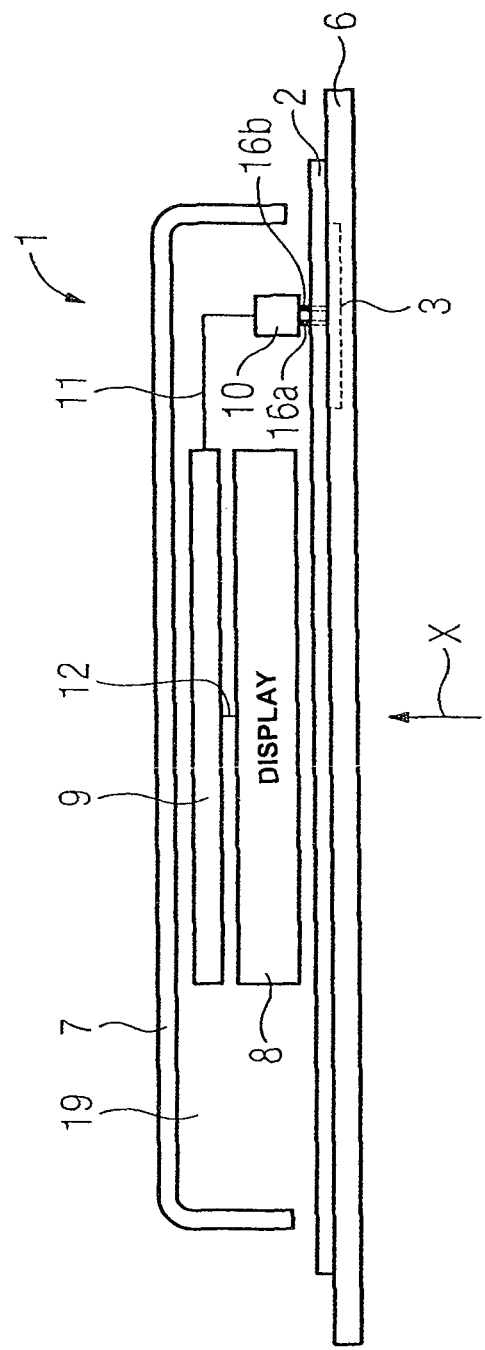
FIG. 6 shows a plan view schematic representation of the operating device in accordance with the invention.

FIG. 6 is a schematic block diagram of the operating device 1 when viewed from above. The same elements are provided with the same reference signs as in the previous figures. Arranged on the underside of the panel 2 is the membrane keyboard 3, with the membrane keyboard 3 represented by dashed lines in the view from above of the operating device 1 that is shown, because in this view the membrane keyboard 3 is covered by the front surround 6. The front surround 6 is arranged in front of the panel 2 in the direction X. The channels and electrically conducting elements 16a, 16b extend through the panel 2, only the two electrically conducting elements 16a and 16b being shown in FIG. 6. In the exemplary embodiment, a connector 10 is fitted over the electrically conducting elements 16a, 16b. By way of the multi-conductor electrical line 11, the connector 10 is connected in an electrically conducting manner to the electronics 9 that are arranged in the interior 19 of the operating device 1 in the exemplary embodiment. In such a way, the membrane keyboard is connected to the electronics 9 by the electrically conducting elements 16a, 16b, the connector 10 and the multi-conductor electrical line 11 for transmission of electrical signals between them. The electrical signals pass from the membrane keyboard 3 to the electronics 9 and are evaluated by the electronics 9. For activation of a display 8, the electronics 9 are connected in an electrically conducting manner to the display 8 by a multi-conductor electrical line 12. Furthermore, the operating device 1 has a housing 7 on its rear side.

Figure 7:
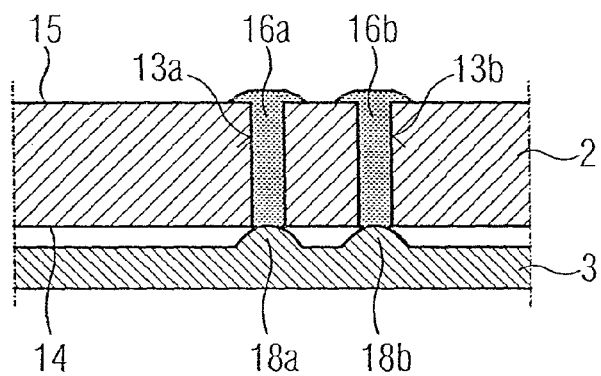
FIG. 7 shows a second exemplary embodiment of the electrically conducting element.

FIG. 7 shows a further embodiment in accordance with the invention. The embodiment shown in FIG. 7 corresponds substantially in its basic construction to the embodiment described above in FIG. 5. The same elements in FIG. 7 are therefore provided with the same reference designator as in FIG. 5. The main difference here is that, in the embodiment according to FIG. 7, the electrically conducting elements 16a and 16b are not formed as pins but as electrically conducting paste or electrically conducting silicone material. In this case, the connector 10 according to FIG. 6 does not have sockets but pins, which are inserted into the electrically conducting elements 16a, 16b, i.e., into the paste or the silicone material, to connect the connector 10 to the electrically conducting elements.

Figure 8:
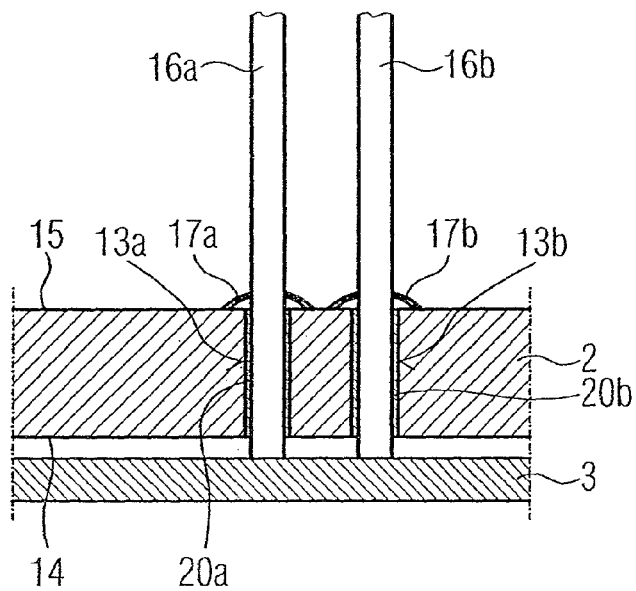
FIG. 8 shows a third exemplary embodiment of the electrically conducting element.

A further embodiment of the invention is shown in FIG. 8. This embodiment corresponds substantially in its basic construction to the embodiments described above in FIG. 5. The same elements are therefore provided with the same reference signs in FIG. 8 as in FIG. 5. The only major difference here is that, in the embodiment according to FIG. 8, the electrically conducting elements 16a and 16b comprise line conductors and protrude out of the membrane keyboard 3. The line conductors may optionally be provided with an insulation, and comprise a single-conductor line, at the end of which, for example, a connector is fitted for the connection to the electronics 9.

It is preferably possible, if necessary, i.e., when the electrically conducting elements comprise pins or line conductors, that seals 20a, 20b are optionally present, sealing the gap that occurs between the electrically conducting elements and the channels through which chemicals, gases, moisture or dirt particles can possibly get into the interior 19 of the operating device 1. The seals may, for example, consist of a silicone material or of rubber or of an adhesive. The seals may, for example, as shown in FIG. 5 and FIG. 8, be arranged between the respective channel and the electrically conducting element arranged in the channel, the seals in FIG. 5 and FIG. 8 being provided with the reference signs 20a and 20b. However, the seals 20a, 20b may, for example, also comprise the lock washers 17a and 17b, which in addition to their fastening functionality may also at the same time have a sealing functionality.

The solutions in accordance with the contemplated embodiments of the invention that have been presented allow much greater freedom in the design of operating front panels. For instance, the number, the form and the position of the membrane keyboards can be freely chosen. The proposed embodiments for establishing contact in accordance with the invention means that there are no longer any restrictions in this respect. The commercially available known seals of operating front panels (IP54, IP65, NEMA 4, etc.) and the resistance to various media (for example, coolants and lubricants) can also continue to be realized to the full extent. Furthermore, the silver conducting lacquer ribbon cables previously necessary for the electrical connection of the membrane keyboard, or the even more expensive copper ribbon cables, are no longer necessary. In addition, a simple exchange of the membrane keyboard 3 is also possible. For instance, damaged or worn membrane keyboards can be replaced by new membrane keyboards without installation of the interior hardware of the operating device. Furthermore, there is also the possibility of the supplier or end user to apply an opaque front film to the panel that is appropriate, for example, typical of the country concerned, for example, at the premises of the supplier or end user.

The disclosed embodiments of the invention make it possible to dispense with ribbon cables with all their disadvantages and allows much greater freedom in the design of operating devices. The disclosed embodiments of the invention also make it possible to continue using the successfully proven membrane keyboard technology, with its great robustness and the haptic, i.e., tactile, feedback possibilities that are optionally integrated into the membrane keyboard.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. An operating device for operating automation technology machinery, comprising:
    a transparent electrically non-conducting panel having an outer side and an inner side, the transparent electrically non-conducting panel facing an interior of the operating device;
    a membrane keyboard arranged on the outer side of the panel;
    a plurality of channels extending through the transparent electrically non-conducting panel from the outer side to the inner side; and
    a plurality of electrically conducting elements respectively arranged in the plurality of channels, the membrane keyboard being connected to electronics of the operating device by the plurality of electrically conducting elements.

2. The operating device as claimed in claim 1, wherein the transparent electrically non-conducting panel comprises one of a glass panel and a plastic panel.

3. The operating device as claimed in claim 1, wherein each of the plurality of electrically conducting elements comprises one of a pin, an electrically conducting paste, electrically conducting silicone material and a line conductor.

4. The operating device as claimed in claim 3, wherein each of the plurality of electrically conducting elements comprises a pin having a gold coating.

5. The operating device as claimed in claim 1, wherein the automation technology machinery comprises at least one of a machine tool and a production machine.

* * * * *